(12) United States Patent
Herzig et al.

(10) Patent No.: US 7,238,755 B2
(45) Date of Patent: *Jul. 3, 2007

(54) BRANCHED SILOXANE POLYMERS COMPRISING ALKENYL GROUPS AND USED AS ANTIMISTING ADDITIVES FOR SILICONE COATING COMPOSITIONS

(75) Inventors: Christian Herzig, Feichten (DE); Reinhard Stallbauer, Gumpersdorf (DE); Christine Weizhofer, Seibersdorf (DE)

(73) Assignee: Wacker Chemie AG, Munich (DE)

( * ) Notice: Subject to any disclaimer, the term of this patent is extended or adjusted under 35 U.S.C. 154(b) by 186 days.

This patent is subject to a terminal disclaimer.

(21) Appl. No.: 10/521,376

(22) PCT Filed: Jul. 10, 2003

(86) PCT No.: PCT/EP03/07521

§ 371 (c)(1),
(2), (4) Date: Jan. 18, 2005

(87) PCT Pub. No.: WO2004/009678

PCT Pub. Date: Jan. 29, 2004

(65) Prior Publication Data

US 2005/0272860 A1    Dec. 8, 2005

(30) Foreign Application Priority Data

Jul. 18, 2002   (DE) ................................. 102 32 668

(51) Int. Cl.
*C08L 83/07*   (2006.01)
(52) U.S. Cl. .................. 525/477; 525/479; 528/15; 528/31; 528/32
(58) Field of Classification Search ............ None
See application file for complete search history.

(56) References Cited

U.S. PATENT DOCUMENTS

| 524,034 | A | | 8/1894 | Wells |
|---|---|---|---|---|
| 5,527,841 | A | * | 6/1996 | Inokuchi et al. ............ 523/435 |
| 5,625,023 | A | | 4/1997 | Chung et al. |
| 5,691,435 | A | | 11/1997 | Herzig et al. |
| 5,698,655 | A | | 12/1997 | Chung et al. |
| 5,760,145 | A | | 6/1998 | Herzig et al. |
| 5,866,707 | A | | 2/1999 | Herzig |
| 5,994,454 | A | | 11/1999 | Chung et al. |
| 6,034,225 | A | | 3/2000 | Weidner et al. |
| 6,093,782 | A | | 7/2000 | Herzig et al. |
| 6,258,913 | B1 | | 7/2001 | Herzig et al. |
| 6,265,497 | B1 | | 7/2001 | Herzig |
| 6,274,692 | B1 | | 8/2001 | Herzig et al. |
| 6,586,535 | B1 | * | 7/2003 | Clark et al. .................. 525/478 |
| 6,764,717 | B2 | * | 7/2004 | Herzig et al. ................ 427/387 |
| 6,956,096 | B2 | * | 10/2005 | Herzig et al. .................. 528/12 |
| 2004/0127636 | A1 | * | 7/2004 | Yamamoto et al. ......... 524/588 |

FOREIGN PATENT DOCUMENTS

| DE | 195 22 144 A1 | 1/1997 |
|---|---|---|
| DE | 196 29 053 A1 | 1/1998 |
| EP | 0 716 115 A2 | 6/1996 |
| WO | WO 01/98418 A2 | 12/2001 |
| WO | WO 01/98420 A2 | 12/2001 |

OTHER PUBLICATIONS

English Derwent Abstract AN 1998-087924 [09] corresponding to DE 196 290 53 A1.
English Derwent Abstract AN 1997-053209 [06] corresponding to DE 195 22 144.

* cited by examiner

*Primary Examiner*—Marc S. Zimmer
(74) *Attorney, Agent, or Firm*—Brooks Kushman P.C.

(57) ABSTRACT

Highly branched alkenyl-functional organopolysiloxane polymers are highly efficient antimisting additives for use in the preparation of silicone release coatings in high speed coating operations. The antimisting additives are miscible with the crosslinkable silicone coating components and produce storage stable compositions which can be used to provide coatings with good release properties.

11 Claims, No Drawings

BRANCHED SILOXANE POLYMERS COMPRISING ALKENYL GROUPS AND USED AS ANTIMISTING ADDITIVES FOR SILICONE COATING COMPOSITIONS

BACKGROUND OF THE INVENTION

1. Field of the Invention

The invention relates to the use of antimisting additives for reducing the formation of aerosol in crosslinkable silicone coating compositions.

2. Description of the Related Art

A trend within the silicone coating industry is to increase machine speed in order to raise productivity. Where silicone coatings are applied to the substrate at relatively high speeds, of more than 300 m/min, for example, fine spray mists of the silicone coating system may be formed. This aerosol is formed at the silicone applicator unit. The formation of this spray mist proves to be a serious problem in the context of further increasing the coating speed.

The formation of this spray mist can be reduced by adding what are known as antimisting additives to the silicone coating system.

EP-A 716 115 (Dow Corning Corp.) and the corresponding U.S. Pat. No. 5,625,023, U.S. Pat. No. 5,698,655 and U.S. Pat. No. 5,994,454 describe anti-misting additives obtained by reacting an organosilicon compound, a compound containing oxyalkylene groups, and a catalyst. The addition of these oxyalkylene-functional reaction products to crosslinkable silicone coating systems reduces the formation of aerosol in rapid coating operations.

WO 01/98420 (Dow Corning Corp.) discloses a liquid silicone antimisting composition obtained by reacting
  (a) an organohydropolysiloxane containing at least 2 Si—H groups (SiH) with
  (b) an organoalkenylsiloxane containing at least 23 alkenyl groups (C=C) in
  (c) the presence of a platinum catalyst and if desired of
  (d) an inhibitor.

An extremely large excess of organoalkenylsiloxane is necessary in order that no gelling occurs. This excess of organoalkenylsiloxane of relatively high functionality, which, moreover, is complicated to synthesize, has a considerable effect on the release properties of the base system, the crosslinkable silicone coating composition. Additionally it is necessary to add an inhibitor in order to prevent gelling.

U.S. Pat. No. 6,034,225 (Wacker-Chemie GmbH) describes alkenyl-functional siloxane polymers which are branched and whose organopolysiloxane blocks are linked by hydrocarbon bridges.

SUMMARY OF THE INVENTION

The object was to provide antimisting additives for silicone coating compositions which reduce the formation of aerosol in rapid coating operations, which are readily miscible with the silicone coating compositions, and which do not impair the silicone coating compositions. This object is achieved by the invention.

DETAILED DESCRIPTION OF THE PREFERRED EMBODIMENTS

The invention provides for the use of antimisting additives in crosslinkable silicone coating compositions for reducing the formation of aerosol, characterized in that use is made as antimisting additives of siloxane polymers containing branched alkenyl groups and preparable by reacting α,ω-dialkenylsiloxane polymers (1) of the general formula $$R^1_x R_{3-x} SiO(R_2Si\text{—}R^2\text{—}SiR_2O)_m(R_2SiO)_n SiR_{3-x}R^1_x \qquad (I)$$

where R denotes identical or different, unhalogenated or halogenated hydrocarbon radicals having from 1 to 18 carbon atoms per radical, $R^1$ is a terminally aliphatically unsaturated organic radical having preferably from 2 to 10 carbon atoms, preferably a terminally aliphatically unsaturated hydrocarbon radical having 2 to 10 carbon atoms, $R^2$ is a divalent organic radical, preferably an alkylene radical, having 2 to 30 carbon atoms per radical or a divalent silane or siloxane radical having 2 to 10 Si units, x can be identical or different and is 0 or 1, preferably 1, on average from 0.7 to 1.0, preferably on average 1.0, m is 0 or an integer from 1 to 10, preferably 0, and n is 0 or an integer from 1 to 1000, preferably from 20 to 1000, more preferably from 50 to 500, with organosilicon compounds (2) containing at least 3 Si-bonded hydrogen atoms per molecule and of the general formula

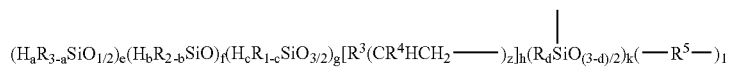

| II | III | IV | V | VI | VII | where R is as defined above, $R^3$ is a trivalent to decavalent aliphatically saturated hydrocarbon radical having 1 to 20 carbon atoms, which may contain one or more heteroatoms selected from the group of oxygen, boron, silicon and titanium, $R^4$ is a hydrogen atom or an alkyl radical having from 1 to 6 carbon atoms per radical, $R^5$ is a divalent hydrocarbon radical having from 2 to 30 carbon atoms, which can be linear, branched or cyclic and may contain one or more separate oxygen atoms, a is 0, 1, 2 or 3, preferably 0 or 1, b is 0, 1 or 2, preferably 0 or 1, c is 0 or 1, preferably 0, d is 0, 1 or 2, preferably 0 or 1, z is an integer from 3 to 10, preferably 3 or 4, more preferably 3, e, f, g, h, k and 1 are each 0 or a positive integer, preferably 0 or an integer from 1 to 40, with the proviso that if h and k are each a positive integer and I is 0, the structural elements V are bonded exclusively to the structural elements VI, and that if h is 0 and k and 1 are each a positive integer, the structural elements VII are bonded to the structural elements VI, in the presence of catalysts (3) which promote the addition of Si-bonded hydrogen onto aliphatic double bond.

The antimisting additives of the invention, the alkenyl-functional siloxane copolymers, have the advantage that they not only reduce the formation of aerosol by cross-linkable silicone coating compositions in rapid coating systems but also, in particular, can be mixed in any desired proportions, homogeneously, with the cross-linkable silicone coating compositions, unlike the antimisting additives containing polyglycol groups from the above-cited EP-A 716 115.

Moreover, the antimisting additives of the invention have no inhibiting effect and are stable on storage. The antimisting additives of the invention have the advantage that they can be blended beforehand with the polymer component (A) of the crosslinkable silicone coating composition. Accordingly they are easy to handle and do not impair the release properties of the base system, the crosslinkable silicone coating composition.

The alkenyl-functional siloxane copolymers of the invention preferably possess a viscosity of from 0.05 to 500,000 Pa·s at 25° C., more preferably from 0.1 to 100,000 Pa·s at 25° C., with particular preference from 0.2 to 10.000 Pa·s at 25° C.

In the alkenyl-functional siloxane copolymers of the invention the siloxane blocks are connected to one another by way of hydrocarbon groups, resulting in a hydrocarbon-siloxane block structure.

Examples of radicals R are alkyl radicals, such as the methyl, ethyl, n-propyl, isopropyl, 1-n-butyl, 2-n-butyl, isobutyl, tert-butyl, n-pentyl, isopentyl, neopentyl, tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; cycloalkyl radicals, such as cyclopentyl, cyclohexyl, cycloheptyl and methylcyclohexyl radicals; aryl radicals, such as the phenyl, naphthyl, anthryl and phenanthryl radical; alkaryl radicals, such as o-, m-, p-tolyl radicals, xylyl radicals and ethylphenyl radicals; and aralkyl radicals, such as the benzyl radical, the α- and the β-phenylethyl radical.

Examples of halogenated radicals R are haloalkyl radicals, such as the 3,3,3-trifluoro-n-propyl radical, the 2,2,2, 2',2',2'-hexafluoroisopropyl radical, the heptafluoroisopropyl radical and haloaryl radicals, such as the o-, m- and p-chlorophenyl radical.

Examples of radicals $R^1$ are alkenyl radicals, such as the vinyl, 5-hexenyl, cyclohexenyl, 1-propenyl, allyl, 3-butenyl and 4-pentenyl radical, and alkynyl radicals, such as the ethynyl, propargyl and 1-propynyl radical. The radical $R^1$ preferably comprises alkenyl radicals, particular preference being given to the vinyl radical.

As α,ω-dialkenylsiloxane polymers (1) it is preferred to use those which each contain at both ends a terminally aliphatically unsaturated hydrocarbon radical, preferably Si-bonded vinyl radical.

In formula (I) x is then 1; on average x is then 1.0.

Preferred α,ω-dialkenylsiloxane polymers (1) used are those of the formula $$R^1R_2SiO(R_2SiO)_nSiR_2R^1 \qquad (I')$$

where R, $R_2$ and n are as defined above.

As α,ω-dialkenylsiloxane polymers (1) it is also possible to use linear organopolysiloxanes such as are described in U.S. Pat. No. 6,274,692 (incorporated by reference), especially column 2 lines 3 to 27, which do not have a terminally aliphatically unsaturated hydrocarbon radical, such as an Si-bonded vinyl group, at both ends but instead also have aliphatically saturated hydrocarbon radicals at the ends, such as Si-bonded methyl groups. In formula (I) x is then on average from 0.7 to 1.0.

As α,ω-dialkenylsiloxane polymers (1) it is also possible to use those obtained by polyaddition of α,ω-dihydrodiorganopolysiloxanes of the formula $$HR_2SiO(SiR_2O)_iSiR_2H \qquad (VIII),$$

where R is as defined above and i is 0 or an integer from 1 to 500, with α,ω-dienes in the presence of hydrosilylation catalysts.

The resulting α,ω-dialkenylsiloxane polymers each have a terminally aliphatically unsaturated hydrocarbon radical at the ends.

In formula (I) x is then 1; on average x is then 1.0.

The α,ω-dialkenylsiloxane polymers (1) preferably possess a viscosity of from 20 to 20,000 mPa·s at 25° C., preferably from 50 to 1000 mPa·s at 25° C.

Examples of α,ω-dialkenylsiloxane polymer (1) are α,ω-divinylpolydimethylsiloxane,
α,ω-diallylpolydimethylsiloxane,
α,ω-dihexenylpolydimethylsiloxane,
α,ω-dioctenylpolydimethylsiloxane, and also polyaddition products of α,ω-dihydrodiorganopolysiloxanes of the formula (IV) and dienes such as
1,5-hexadiene,
1,7-octadiene,
1,9-decadiene,
1,11-dodecadiene,
1,13-tetradecadiene,
2,5-dimethyl-1,5-hexadiene,
3,5-dimethyl-1,6-heptadiene,
1,3-divinylbenzene,
1,4-divinylbenzene, 1,3-diisopropenylbenzene, divinyldimethylsilane,
1,3-divinyl-1,1,3,3-tetramethyldisiloxane, preference being given to α,ω-divinyldimethylsiloxanes and α,ω-dihexenylpolydimethylsiloxanes.

Examples of radicals $R^2$ are therefore those of the formula

—$(CH_2)_6$— 

—$(CH_2)_8$— 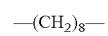

—$(CH_2)_{10}$— 

—$(CH_2)_{12}$— 

—(CH$_2$)$_{14}$—

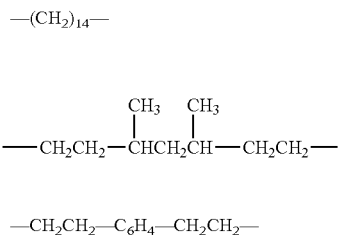

—CH$_2$CH$_2$—C$_6$H$_4$—CH$_2$CH$_2$— preference being given to the radical of the formula —(CH$_2$)$_6$—.

As organosilicon compounds (2) containing at least 3 Si-bonded hydrogen atoms it is preferred to use those containing structural units of the formula (II), (III) and, if desired, (IV), especially (II) and (III).

The organosilicon compounds (2) contain per molecule preferably from 4 to 50 Si-bonded hydrogen atoms, more preferably from 4 to 20 Si-bonded hydrogen atoms. In particular the Si-bonded hydrogen atoms are present in the structural units (II) with a=1 and the structural units (III) with b=1.

As organosilicon compound (2) it is preferred to use those of the formula $$H_yR_{3-y}SiO(SiR_2O)_o(SiRHO)_pSiR_{3-y}H_y \quad (IX)$$

where R is as defined above, y is 0, 1 or 2, o is 0 or an integer from 1 to 1500 and p is an integer from 1 to 200, with the proviso that there are at least 3 Si-bonded hydrogen atoms per molecule.

In the context of this invention formula IX should be understood such that o units —(SiR$^5_2$O)— and p units —(SiR$^5$HO)— may be distributed arbitrarily within the organopolysiloxane molecule.

Examples of such organopolysiloxanes are, in particular, copolymers comprising dimethylhydrosiloxane, methyl-hydrosiloxane, dimethylsiloxane and trimethylsiloxane units, copolymers comprising trimethylsiloxane, dimethyl-hydrosiloxane and methylhydrosiloxane units, copolymers comprising trimethylsiloxane, dimethylsiloxane and methylhydrosiloxane units, copolymers comprising methyl-hydrosiloxane and trimethylsiloxane units, copolymers comprising methylhydrosiloxane, diphenylsiloxane and trimethylsiloxane units, copolymers comprising methyl-hydrosiloxane, dimethylhydrosiloxane and diphenylsiloxane units, copolymers comprising methylhydrosiloxane, phenylmethylsiloxane, trimethylsiloxane and/or dimethyl-hydrosiloxane units, copolymers comprising methylhydro-siloxane, dimethylsiloxane, diphenylsiloxane, trimethyl-siloxane and/or dimethylhydrosiloxane units, and copolymers comprising dimethylhydrosiloxane, trimethyl-siloxane, phenylhydrosiloxane, dimethylsiloxane and/or phenylmethylsiloxane units.

Organosilicon compounds (2) preferably also include those containing the structural units (II), (VI) and (VII). Organosilicon compounds of this kind are described in U.S. Pat. No. 5,866,707 (incorporated by reference), especially column 1 line 54 to column 2 line 50.

As organosilicon compounds (2) it is preferred also to make use of those containing the structural units (II), (V), (VI) and if desired (III). Organosilicon compounds (2) of this kind are described in U.S. Pat. No. 5,691,435 (incorporated by reference), especially column 3 line 45 to column 4 line 29, and in U.S. Pat. No. 6,093,782 (incorporated by reference), especially column 3 lines 8 to 47.

In structural unit V the radical R$^3$ is preferably a trivalent hydrocarbon radical having preferably from 1 to 20 carbon atoms and z is therefore preferably 3 and in the structural unit VI d is preferably 0 or 1.

Examples of radicals R$^3$ are those of the formula

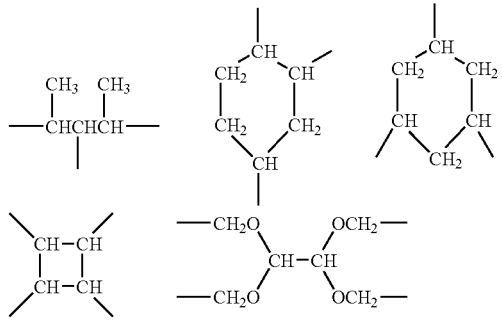

preference being given to the radical of the formula

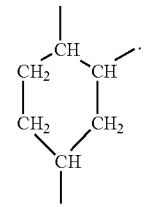

Examples of alkyl radicals R$^4$ are the methyl, ethyl, n-propyl, isopropyl, 1-n-butyl, 2-n-butyl, isobutyl, tert-butyl, n-pentyl, isopentyl, neopentyl, tert-pentyl radical and hexyl radicals, such as the n-hexyl radical. Preferably R$^4$ is a hydrogen atom.

Examples of hydrocarbon radicals R$^5$ are those of the formula

—(CH$_2$)$_2$—

—(CH$_2$)$_3$—

—(CH$_2$)$_4$—

—(CH$_2$)$_6$—

—(CH$_2$)$_8$—

—CH$_2$—CH(CH$_3$)—CH$_2$—CH$_2$—CH(CH$_3$)—CH$_2$

The organosilicon compounds (2) preferably possess an average viscosity of from 20 to 20.000 mPa·s at 25° C., more preferably from 100 to 10,000 mPa·s at 25° C.

α,ω-Dialkenylsiloxane polymer (1) is used in the process of the invention in amounts such that the ratio of the number of aliphatic double bond in α,ω-dialkenylsiloxane polymer (1) to the number of Si-bonded hydrogen atoms in organosilicon compound (2) is from 1.2 to 50, preferably from 2 to 20, more preferably from 3 to 15.

Depending on the ratio in which (1) is used relative to (2), products are obtained which, following complete consumption of the Si-bonded hydrogen atoms originally present in (2), still always contain varying amounts of α,ω-dialkenylsiloxane polymer (1). Since the reaction products of (1) and (2) according to the invention are used in crosslinkable silicone coating compositions in which the base polymer in any case is generally composed predominantly of α,ω-dialkenylsiloxane polymers, a certain residual amount of reactant (1) is not disruptive, but is instead incorporated into the network which forms, in the course of the vulcanization process.

Depending on the structure of the reactants (1) and (2) and on the desired degree of branching of the reaction product, the antimisting additive of the invention, said product may contain from about 10 to 95% by weight of reactant (1). It is advantageous to obtain a very high concentration of reaction product of (1) and (2), so that in preferred versions the fraction of residual α,ω-dialkenylsiloxane polymer (1) is less than 75% by weight, preferably less than 50% by weight.

In particular constellations, in which for reasons of handling the mixture obtained following reaction of the reactants (1) and (2) and comprising reaction product and reactant (1) is to have a low viscosity, it may be necessary to aim for a relatively low concentration of the highly branched reaction product of (1) and (2).

As catalysts (3) which promote the addition of Si-bonded hydrogen onto aliphatic double bond it is possible in the process of the invention as well to use the same catalysts which it has also been possible to date to use for promoting the addition of Si-bonded hydrogen onto aliphatic double bond. The catalysts (3) are preferably a metal from the group of the platinum metals or a compound or a complex from the group of the platinum metals. Examples of such catalysts are metallic and finely divided platinum, which may be on supports, such as silica, alumina or activated carbon, compounds or complexes of platinum, such as platinum halides, e.g., $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes, such as platinum-1,3-divinyl-1,1,3,3-tetramethyldisiloxane complexes with or without a detectable inorganically bonded halogen content, bis(gamma-picoline)platinum dichloride, trimethylenedipyridineplatinum dichloride, dicyclopentadieneplatinum dichloride, dimethyl-sulfoxide-ethyleneplatinum(II) dichloride, cyclooctadieneplatinum dichloride, norbornadieneplatinum dichloride, gamma-picolineplatinum dichloride, cyclopentadieneplatinum dichloride.

In the first process step the catalyst (3) is used preferably in amounts of from 0.5 to 50 ppm by weight (parts by weight per million parts by weight), more preferably in amounts of from 1 to 10 ppm by weight, calculated in each case as elemental platinum and based on the overall weight of α,ω-dialkenylsiloxane polymer (1) and organosilicon compound (2).

The process of the invention is preferably conducted at the pressure of the surrounding atmosphere, i.e., approximately at 1020 hPa (abs.), but may also be conducted at higher or lower pressures. Furthermore, the process of the invention is conducted preferably at a temperature of from 0° C. to 150° C., more preferably from 20° C. to 120° C., with particular preference from 20° C. to 80° C.

In the process of the invention it is possible to use preferably inert, organic solvents. Examples of inert, organic solvents are toluene, xylene, octane isomers, heptane isomers, butyl acetate, isopropyl myristate, 1,2-dimethoxyethane, tetrahydrofuran, and cyclohexane.

The inert organic solvents, where used, may be removed by distillation after the reaction or may remain in the reaction mixture.

The process of the invention can be conducted batchwise, semicontinuously or fully continuously.

Alternatively to the single-stage process for preparing the siloxane polymers of the invention containing branched alkenyl groups they may also be obtained in a two-stage process:

for this purpose organosilicon compounds (2) are reacted first with a small amount of α,ω-dialkenylsiloxane polymer (1) under platinum catalysis. After the alkenyl groups have been consumed by reaction this intermediate is metered rapidly into a relatively large excess of α,ω-dialkenylsiloxane polymer (1), homogenized and supplemented where appropriate by further supply of catalyst. The two-stage process is preferably performed under similar conditions to the single-stage process. The two-stage process is employed advantageously when using particularly high molecular mass compounds (2), which are difficult to obtain in any other way.

For reducing the formation of aerosol the antimisting additives of the invention are added to the crosslinkable silicone coating compositions.

The antimisting additives of the invention, the alkenyl-functional siloxane copolymers, are used in the cross-linkable silicone coating compositions preferably in amounts of from 0.5 to 10% by weight, more preferably from 1 to 5% by weight, based on the overall weight of the crosslinkable silicone coating compositions.

Use is preferably made as crosslinkable silicone coating compositions those comprising
(A) organosilicon compounds having radicals containing aliphatic carbon-carbon multiple bonds,
(B) organosilicon compounds containing Si-bonded hydrogen atoms,
(C) catalysts which promote the addition of Si-bonded hydrogen onto aliphatic multiple bond,
and if desired
(D) inhibitors.

The invention further provides crosslinkable silicone coating compositions featuring reduced aerosol formation, comprising
(X) antimisting additives of the invention,
(A) organosilicon compounds having radicals containing aliphatic carbon-carbon multiple bonds,
(B) organosilicon compounds containing Si-bonded hydrogen atoms,
(C) catalysts which promote the addition of Si-bonded hydrogen onto aliphatic multiple bond,
and if desired
(D) inhibitors.

For the crosslinkable silicone coating compositions it is possible with preference to use one kind of the anti-misting additive (X) of the invention or different kinds of the antimisting additive (X) of the invention.

As organopolysiloxanes (A) having radicals containing aliphatic carbon-carbon multiple bonds it is preferred to use linear or branched organopolysiloxanes comprising units of the general formula X

where $R^6$ is a monovalent, unsubstituted or substituted hydrocarbon radical having from 1 to 18 carbon atoms per radical and being free from aliphatic carbon-carbon multiple bonds and $R^7$ is a monovalent hydrocarbon radical having from 2 to 8 carbon atoms per radical and containing a terminal aliphatic carbon-carbon multiple bond, z is 0, 1, 2 or 3, y is 0, 1 or 2 and the sum z+y is 0, 1, 2 or 3, with the proviso that there are on average at least 1.5 radicals $R^7$, preferably on average at least 2 radicals $R^7$.

Preferred organosilicon compounds (A) are organopolysiloxanes of the general formula $$R^7_u R^6_{3-u} SiO(SiR^6_2 O)_v (SiR^6 R^7 O)_w SiR^6_{3-u} R^7_u \qquad (XI)$$

where $R^6$ and $R^7$ are as defined above, u is 0, 1 or 2, v is 0 or an integer from 1 to 1500, and w is 0 or an integer from 1 to 200, with the proviso that on average at least 1.5 radicals $R^7$, preferably on average at least 2 radicals $R^7$, are present.

In the context of this invention formula (XI) is to be understood to mean that v units —(SiR$^6_2$O)— and w units —(SiR$^6$R$^7$O)— may be distributed arbitrarily in the organopolysiloxane molecule.

As organosilicon compounds (A) it is also possible to use branched polymers containing terminal ω-alkenyl groups, preferably Si-bonded vinyl groups, as described in U.S. Pat. No. 6,258,913 (incorporated by reference), especially column I line 62 to column 2 line 35.

As organosilicon compounds (A) it is also possible to use linear organopolysiloxanes as described in U.S. Pat. No. 6,274,692 (incorporated by reference), especially column 2 lines 3 to 27, which do not have an aliphatically unsaturated hydrocarbon radical, such as an Si-bonded vinyl group, at both ends but instead also have aliphatically saturated hydrocarbon radicals, such as Si-bonded methyl groups, at the ends.

As organosilicon compounds (A) it is also possible to use those as described in U.S. Pat. No. 5,241,034 (incorporated by reference), especially column 16 line 23 to column 17 line 35, DE-A 195 22 144 (incorporated by reference), especially page 2 lines 44 to 67, DE-A 196 29 053 (incorporated by reference), especially page 2 line 51 to page 3 line 29, U.S. Pat. No. 5,760,145 (incorporated by reference), especially column 2 line 46 to column 4 line 23, and U.S. Pat. No. 6,265,497 (incorporated by reference), especially column 2 lines 3 to 47.

The organopolysiloxanes (A) preferably possess an average viscosity of from 100 to 10,000 mPa·s at 25° C.

Examples of hydrocarbon radicals $R^6$ are alkyl radicals, such as the methyl, ethyl, n-propyl, isopropyl, n-butyl, isobutyl, tert-butyl, n-pentyl, isopentyl, neopentyl, tert-pentyl radical; hexyl radicals, such as the n-hexyl radical; heptyl radicals, such as the n-heptyl radical; octyl radicals, such as the n-octyl radical and isooctyl radical, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; cycloalkyl radicals, such as cyclopentyl, cyclohexyl, cycloheptyl radicals and methylcyclohexyl radicals; aryl radicals, such as the phenyl, naphthyl, anthryl and phenanthryl radical; alkaryl radicals, such as o-, m-, p-tolyl radicals, xylyl radicals and ethylphenyl radicals; and aralkyl radicals, such as the benzyl radical, the α- and the β-phenylethyl radical.

Examples of radicals $R^7$ are alkenyl radicals, such as the vinyl, 5-hexenyl, allyl, 3-butenyl and 4-pentenyl radical; and alkynyl radicals, such as the ethynyl, propargyl and 1-propyne radical.

As organosilicon compounds (B) which contain Si-bonded hydrogen atoms it is preferred to use linear, cyclic or branched organopolysiloxanes comprising units of the general formula XII $$R^6_j H_r SiO_{\frac{4-e-f}{2}}, \qquad (XII)$$

where $R^6$ is as defined above, j is 0, 1, 2 or 3, r is 0, 1 or 2 and the sum of j+r is 0, 1, 2 or 3, with the proviso that there are on average at least 2 Si-bonded hydrogen atoms.

The organosilicon compounds (B) preferably contain at least 3 Si-bonded hydrogen atoms.

As organosilicon compounds (B) it is more preferred to use organopolysiloxanes of the general formula $$H_q R^6_{3-q} SiO(SiR^6_2 O)_s (SiR^6 HO)_t SiR^6_{3-q} H_q \qquad (XIII)$$

where $R^6$ is as defined above, q is 0, 1 or 2, s is 0 or an integer from 1 to 1500, and t is 0 or an integer from 1 to 200, with the proviso that there are on average at least 2 Si-bonded hydrogen atoms.

In the context of this invention formula XIII is to be understood to mean that o units —(SiR$^6_2$O)— and p units —(SiR$^6$HO)— may be distributed arbitrarily in the organopolysiloxane molecule.

Examples of such organopolysiloxanes are, in particular, copolymers comprising dimethylhydrosiloxane, methyl-hydrosiloxane, dimethylsiloxane and trimethylsiloxane units, copolymers comprising trimethylsiloxane, dimethyl-hydrosiloxane and methylhydrosiloxane units, copolymers comprising trimethylsiloxane, dimethylsiloxane and methylhydrosiloxane units, copolymers comprising methyl-hydrosiloxane and trimethylsiloxane units, copolymers comprising methylhydrosiloxane, diphenylsiloxane and trimethylsiloxane units, copolymers comprising methyl-hydrosiloxane, dimethylhydrosiloxane and diphenylsiloxane units, copolymers comprising methylhydrosiloxane, phenylmethylsiloxane, trimethylsiloxane and/or dimethyl-hydrosiloxane units, copolymers comprising methyl-hydrosiloxane, dimethylsiloxane, diphenylsiloxane, trimethylsiloxane and/or dimethylhydrosiloxane units, and copolymers comprising dimethylhydrosiloxane, trimethyl-siloxane, phenylhydrosiloxane, dimethylsiloxane and/or phenylmethylsiloxane units.

As organosilicon compounds (B) it is also possible to use those as described in U.S. Pat. No. 5,691,435 (incorporated by reference), especially column 3 line 45 to column 4 line 29.

The organopolysiloxanes (B) preferably possess an average viscosity of from 10 to 1000 mPa·s at 25° C.

Organosilicon compound (B) is used preferably in amounts of from 0.5 to 3.5, more preferably from 1.0 to 3.0, gram atoms of Si-bonded hydrogen per mole of Si-bonded radical containing aliphatic carbon-carbon multiple bond in the organosilicon compound (A).

In the case of the crosslinkable silicone coating compositions as well it is possible, as catalysts which promote the addition of Si-bonded hydrogen onto aliphatic multiple bonds, to use the same catalysts which it has also been possible to use to date to promote the addition of Si-bonded hydrogen onto aliphatic multiple bond. As constituent (C) it is preferred to use the abovementioned catalysts (3).

The catalysts (C) are used preferably in amounts of from 10 to 1000 ppm by weight (parts by weight per million parts by weight), more preferably from 50 to 200 ppm by weight, calculated in each case as elemental platinum metal and based on the overall weight of the organo-silicon compounds (A) and (B).

The crosslinkable silicone coating compositions may comprise agents which retard the addition of Si-bonded hydrogen onto aliphatic multiple bond at room tempe-rature, known as inhibitors (D).

For the crosslinkable silicone coating compositions as well it is possible as inhibitors (D) to use all inhibitors which it has also been possible to use to date for the same purpose.

Examples of inhibitors (D) are 1,3-divinyl-1,1,3,3-tetra-methyldisiloxane, benzotriazole, dialkylformamides, alkylthioureas, methyl ethyl ketoxime, organic compounds or organosilicon compounds having a boiling point of at least 25° C. at 1012 mbar (abs.) and containing at least one aliphatic triple bond, such as 1-ethynylcyclohexan-1-ol, 2-methyl-3-butyn-2-ol, 3-methyl-1-pentyn-3-ol, 2,5-di-methyl-3-hexyne-2,5-diol and 3,5-dimethyl-1-hexyn-3-ol, 3,7-dimethyloct-1-yn-6-en-3-ol, a mixture of diallyl maleate and vinyl acetate, maleic monoesters, and inhibitors such as the compound of the formula HC≡C—C(CH$_3$)(OH)—CH$_2$—CH$_2$—CH=C(CH$_3$)$_2$, available commercially under the trade name "Dehydrolinalool" from BASF.

Where inhibitor (D) is used, it is employed appropriately in amounts of preferably from 0.01 to 10% by weight, more preferably from 0.01 to 3% by weight, based on the overall weight of the organosilicon compounds (A) and (B).

Examples of further constituents which may be used in the crosslinkable silicone coating compositions are agents for adjusting the release force, organic solvents, adhesion promoters, and pigments.

Examples of agents for adjusting the release force of the coatings, repellent to tacky substances, that are produced with the compositions of the invention are silicone resins comprising units of the formula

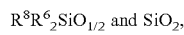

known as MQ resins, where $R^8$ is a hydrogen atom, a hydrocarbon radical $R^6$, such as methyl radical, an alkenyl radical $R^7$, such as vinyl radical, and $R^6$ and $R^7$ are as defined above, and the units of the formula $R^8R^6{}_2SiO_{1/2}$ may be identical or different. The ratio of units of the formula $R^8R^6{}_2SiO_{1/2}$ to units of the formula $SiO_2$ is preferably from 0.6 to 2. The silicone resins are used preferably in amounts of from 5 to 80% by weight, based on the overall weight of the organosilicon compounds (A) and (B).

Examples of organic solvents are petroleum spirits, e.g., mixtures of alkanes having a boiling range of from 70° C. to 180° C., n-heptane, benzene, toluene and xylenes, halogenated alkanes having from 1 to 6 carbon atom(s), such as methylene chloride, trichloroethylene and per-chloroethylene, ethers, such as di-n-butyl ether, esters, such as ethyl acetate, and ketones, such as methyl ethyl ketone and cyclohexanone.

Where organic solvents are used, they are employed appropriately in amounts of preferably from 10 to 90% by weight, more preferably from 10 to 70% by weight, based on the overall weight of the organosilicon compounds (A) and (B).

Although the sequence when mixing the constituents (X), (A), (B), (C) and, where used, (D) is not critical, it has nevertheless been found appropriate for practical purposes to add constituent (C), viz. the catalyst, last to the mixture of the other constituents.

The crosslinking of the compositions of the invention takes place preferably at from 70° C. to 180° C. As energy sources for thermal crosslinking it is preferred to use ovens, e.g., forced air drying ovens, heating tunnels, heated rollers, heated plates, or heat rays from the infrared region.

As well as thermally, the compositions of the invention may also be crosslinked by irradiation with ultraviolet light or by irradiation with UV and IR light. As ultraviolet light it is common to use that having a wavelength of 253.7 nm. In commerce there are a large number of lamps which emit ultraviolet light having a wavelength of from 200 to 400 nm and which preferentially emit ultraviolet light having a wavelength of 253.7 nm.

The invention further provides shaped bodies produced by crosslinking the compositions of the invention.

The shaped bodies preferably comprise coatings, more preferably coatings which repel tacky substances.

The invention further provides a process for producing coatings by applying crosslinkable compositions of the invention to the surfaces that are to be coated and then crosslinking the compositions.

The crosslinkable compositions of the invention are used preferably for producing coatings which repel tacky substances, e.g., for producing release papers. Coatings which repel tacky substances are produced by applying crosslinkable compositions of the invention to the surfaces that are to be made repellent to tacky substances and then crosslinking the compositions.

The application of the compositions of the invention to the surfaces to be coated, preferably surfaces to be made repellent to tacky substances, may be accomplished in any desired manner which is suitable and widely known for the production of coatings from liquid materials; for example, by dipping, brushing, pouring, spraying, rolling, printing, by means of an offset gravure coating apparatus, for example, blade or knife coating, or by means of an airbrush.

The coat thickness on the surfaces to be coated is preferably from 0.3 to 6 μm, with particular preference from 0.5 to 2.0 μm.

The surfaces to be coated, preferably surfaces to be made repellent to tacky substances, which may be treated in the context of the invention may be surfaces of any materials which are solid at room temperature and 1012 mbar (abs.). Examples of surfaces of this kind are those of paper, wood, cork, and polymer films, e.g., polyethylene films or polypropylene films, woven and non-woven fabric of natural or synthetic fibers, ceramic articles, glass, including glass fibers, metals, polyethylene-coated paper, and boards, including those of asbestos. The abovementioned polyethylene may in each case be high-pressure, medium-pressure or low-pressure polyethylene. In the case of paper the paper in question may be of a low-grade kind, such as absorbent papers, including kraft paper which is in the raw state, i.e., has not been pretreated with chemicals and/or natural polymeric substances, and which has a weight of from 60 to 150 g/m$^2$, unsized papers, papers of low freeness value, mechanical papers, unglazed or uncalendered papers, papers which are smooth on one side owing to the use of a dry glazing cylinder during their production, without additional complex measures, and which are therefore referred to as "machine-glazed papers", uncoated papers or papers produced from waste paper, i.e., what are known as recycled papers. The paper to be treated in accordance with the invention may also of course, however, comprise high-grade paper types, such as low-absorbency papers, sized papers, papers of high freeness value, chemical papers, calendered or glazed papers, glassine papers, parchmentized papers or precoated papers. The boards as well may be of high or low grade.

The compositions of the invention are suitable, for example, for producing release, backing, and interleaving papers, including interleaving papers which are employed in the production of, for example, cast films or decorative films, or of foam materials, including those of polyurethane. The compositions of the invention are also suitable, for example, for producing release, backing, and interleaving cards, films, and cloths, for treating the reverse sides of self-adhesive tapes or self-adhesive sheets or the written faces of self-adhesive labels. The compositions of the invention are additionally suitable for treating packing material, such as that comprising paper, cardboard boxes, metal foils and drums, e.g., cardboard, plastic, wood or iron, which is intended for storing and/or transporting tacky goods, such as adhesives, sticky foodstuffs, e.g., cakes, honey, candies, and meat; bitumen, asphalt, greased materials, and crude rubber. A further example of the application of the compositions of the invention is the treatment of carriers for transferring pressure-sensitive adhesive films in the context of what is known as the transfer process.

The crosslinkable silicone coating compositions comprising the antimisting additives of the invention are especially suitable for use in rapid coating systems with coating speeds of preferably from 300 to 1500 m/min, more preferably from 400 to 1000 m/min, in which the compositions of the invention are applied at high speeds to the surfaces that are to be coated.

The compositions of the invention are suitable for producing the self-adhesive materials joined to the release paper, both by the offline method and by the inline method.

In the offline method, the silicone composition is applied to the paper and crosslinked, and then, in a subsequent stage, normally after the winding of the release paper onto a roll and after the storage of the roll, an adhesive film, present for example on a label face paper, is applied to the coated paper and the composite is then compressed. In the inline method the silicone composition is applied to the paper and crosslinked, the silicone coating is coated with the adhesive, the label face paper is then applied to the adhesive, and the composite, finally, is compressed. In the case of the offline method the winding speed is governed by the time needed to render the silicone coating tack-free. In the case of the inline method the process speed is governed by the time needed to render the silicone coating migration-free. With the compositions of the invention the offline method and the inline method can be operated at speeds from 300 to 1500 m/min, preferably from 400 to 1000 m/min.

1. Preparation of branched-alkenyl-functional siloxane polymers

EXAMPLE 1

244 g of a linear α,ω-divinylpolydimethylsiloxane having an iodine number of 4.2 are mixed homogeneously with 0.35 g of a copolymer comprising dimethylsiloxy-, hydromethylsiloxy and trimethylsiloxy units, containing 0.72% by weight of Si-bonded hydrogen and having a viscosity of 64 mm$^2$/s at 25° C. (C=C/SiH=16). Thereafter 0.21 g of a 1.15% by weight strength (based on elemental platinum) solution of a platinum-1,3-divinyl-1,1,3,3-tetramethyldisiloxane complex in an α,ω-divinyldimethyl-polysiloxane having a viscosity of 1000 mPa·s at 25° C., a solution of the Karstedt catalyst (whose preparation is described in U.S. Pat. No. 3,775,452), as it is known, is added and the reaction mixture is heated to 50° C. Over the course of two hours the viscosity of the mixture increases from 490 mm$^2$/s to 830 mm$^2$/s at 25° C. The product is colorless and clear and has a vinyl equivalent weight of 6470 g/mol C=C.

EXAMPLE 2

In deviation from Example 1 a branched siloxane polymer with longer arm segments is prepared, by using, instead of the α,ω-divinylpolydimethylsiloxane with an iodine number of 4.2, a longer α,ω-divinylpolydimethylsiloxane having an iodine number of 1.43. The amount of the copolymer containing 0.72% by weight of Si-bonded hydrogen is reduced to 0.12 g (C=C/SiH=16). Following identical catalysis (as described in Example 1) with an analogous reaction course, a colorless, clear product is obtained, of 14,400 mm$^2$/S at 25° C. and a vinyl equivalent weight of 18,960 g/mol C=C.

EXAMPLE 3

The procedure of Example 1 is repeated with the modification that the amount of the α,ω-divinylpoly-dimethylsiloxane is reduced to 63% of the amount used there (C=C/SiH=10). After the end of the reaction a clear colorless product is obtained which has a viscosity of 1270 mm$_2$/s at 25° C. and thus is substantially more viscous than the product of Example 1. The vinyl equivalent weight is now 6740 g/mol C=C. Although the product is constructed from the identical structural elements as in Example 1, it has a substantially higher degree of branching by comparison.

Comparative Experiment 1 in accordance with WO 01/98420

The procedure of Example 3 is repeated with the modification that, instead of the linear α,ω-divinylpoly-dimethylsiloxane with an iodine number of 4.2, 80 g of a vinyl-terminal polydimethylsiloxane branched via MeSiO$_{3/2}$ groups (Me=methyl radical) are used, having a viscosity of 380 mm$^2$/s at 25° C. and an iodine number of 8.1. This polymer contains on average about 3 CH$_2$=CHSiMe$_2$O$_{1/2}$ groups per molecule. The mixture has a vinyl/SiH ratio of 10 in analogy to Example 3. Following addition of catalyst in analogy to Example 3 at 50° C. there is a sharp rise in the viscosity of the mixture. A little later a siloxane gel is formed, which can no longer be dissolved in toluene.

EXAMPLE 4

A polymer with the same high degree of branching as the product of Example 3 but with a higher viscosity can be prepared by increasing the chain length of the α,ω-divinylpolydimethylsiloxane. Reacting, therefore, 202 g of a linear α,ω-divinylpolydimethylsiloxane having an iodine number of 3.14 (rather than 4.2) with 0.35 g of the hydrosiloxane containing 0.72% by weight of Si-bonded hydrogen (C=C/SiH=10) then gives a product of 2300 mm$^2$/s at 25° C. and a vinyl equivalent weight of 9020 g/mol C=C.

EXAMPLE 5

Highly branched siloxane polymers are also obtainable by using hydrosiloxanes which already contain branching, in combination with linear vinyl polymers:

reacting, therefore, as in Example 1, 244 g of a linear α,ω-divinylpolydimethylsiloxane having an iodine number of 4.2 with 0.46 g of a branched siloxane whose preparation was described in U.S. Pat. No. 5,866,707 in Example 1 and which contains exclusively HMe$_2$SiO$_{1/2}$ groups instead of HMeSiO groups (Me=methyl radical) and also possesses a viscosity of 47 mm$^2$/s at 25° C. and an Si-bonded hydrogen content of 0.87% by weight (C=C/SiH=10), the product, after full conversion of the Si-bonded hydrogen atoms, is a clear oil having a viscosity of 970 mm$^2$/s (25° C.) with a vinyl equivalent weight of 6780 g/mol C=C.

EXAMPLE 6

In analogy to the procedure of Example 1, 254 g of an α,ω-divinylpolydimethylsiloxane with an iodine number of 7.0 are reacted with 4.37 g of a linear copolymer comprising hydromethylsiloxy, dimethylsiloxy and trimethylsiloxy units, containing 0.32% by weight of Si-bonded hydrogen and having a viscosity of 38 mm$^2$/s at 25° C., in the presence of the platinum catalyst described in Example 1 (C=C/SiH=5.0). The clear colorless oil obtained has a viscosity of 1330 mm$^2$/s at 25° C. and a vinyl equivalent weight of 4620 g/mol C=C.

EXAMPLE 7

The procedure of Example 6 is repeated with the modification that a hydrosiloxane is used which contains an even lower fraction of Si-bonded hydrogen: the 4.37 g of copolymer used in Example 6 are replaced by 24.1 g of a copolymer containing only 0.083% by weight of Si-bonded hydrogen and having a viscosity of 97 mm$^2$/s at 25° C. (C=C/SiH=3.5). Following complete conversion a clear colorless oil is obtained which has a viscosity of 1940 mm$^2$/S (25° C.) and a vinyl equivalent weight of 5570 g/mol C=C.

Comparative Experiment 2 in accordance with WO 01/98420

The procedure of Example 7 is repeated with the modification that the linear α,ω-divinylpoly-dimethylsiloxane having an iodine number of 7.0 from Example 7 is replaced by 220 g of the T-branched vinyl-terminal polydimethylsiloxane containing about 3 CH$_2$=CHSiMe$_2$O$_{1/2}$ groups per molecule, from Comparative Experiment 1, so that the mixture again has a vinyl/SiH ratio of 3.5 in analogy to Example 7. Following identical catalysis there is very rapid increase in viscosity, with subsequent gelling of the reaction mixture to a hard rubber, which is insoluble in toluene.

EXAMPLE 8

In a two-stage reaction first 43.4 g of a linear copolymer comprising hydromethylsiloxane and dimethyl-siloxane units, terminated with trimethylsiloxane end units and containing 0.083% by weight of Si-bonded hydrogen and having a viscosity of 97 mm$^2$/s at 25° C. are reacted with 21.8 g of a linear α,ω-divinyl-polydimethylsiloxane with an iodine number of 4.2, with catalysis by 10 ppm of platinum in the form of the platinum catalyst described in Example 1, at 40° C. The siloxane mixture obtained is metered rapidly into a further 1412 g of the linear α,ω-divinylpolydimethylsiloxane with an iodine number of 4.2 and the mixture is then made up to a platinum content of 10 ppm with the above platinum catalyst. In a weakly exothermic reaction, after two hours, a colorless, clear product is obtained which has a viscosity of 2400 mm$^2$/s at 25° C. and a vinyl equivalent weight of 7350 g/mol C=C(C=C/SiH=6.4).

2. Use of the branched-alkenyl-functional siloxane polymers as antimisting additives:

EXAMPLE 9

At a high application weight and with certain coating formulations, aerosol may be formed even at machine speeds well below 500 m/min. The branched siloxane copolymers of the invention were used, for reducing the formation of aerosol, as an additive in crosslinkable silicone coating systems for use in such coating processes.

The standard formulation used was a mixture of 100 parts by weight of a branched polysiloxane containing vinyldimethylsiloxy end groups, having a viscosity of 420 mPa.s (25° C.) and an iodine number of 8.0, prepared in accordance with Example 3 of U.S. Pat. No. 6,034,225, 3.6 parts by weight of a linear polysiloxane comprising hydromethylsiloxane and trimethylsiloxane units in a molar ratio of 24:1, 1.04 parts by weight of a 1% strength by weight (based on elemental platinum) solution of a platinum-1,3-divinyl-1,1,3,3-tetramethyldisiloxane complex in an α,ω-divinyl-dimethylpolysiloxane having a viscosity of 1000 mPa·s at 25° C., and 0.3 part by weight of 1-ethynylcyclohexanol.

The additives of the invention from the preparation examples indicated in table 1 were added to the standard formulation in the amounts specified in table 1. As a control, a standard formulation without inventive additive was used. These mixtures were used for coating paper.

The substrate used was paper from Ahlstrom bearing the designation Glassine Larice Tipo 325, 62 g/m$^2$. Coating was carried out on the pilot coating unit from Dixon with the model number 1060, having a 5-roll applicator unit, at 150 m/min. The application roll was run at 95% of the paper speed. The coating was cured in a drying oven with a length of 3 m at 140° C.

The formation of aerosol was determined using the Dusttrak Aerosol Monitor Model 8520. Samples were taken between the silicone application roll and the roll nip at a distance of 12 cm from the silicone application roll.

During the coating experiments, the maximum indicated aerosol levels were recorded. The coating weight was determined by means of X-ray fluorescence analysis in reference to an appropriate standard, and was 2.5 g/m$^2$. The results are summarized in table 1.

TABLE 1

| Additive | Amount of additive in % | Misting, mg/m³ (Dusttrak) |
|---|---|---|
| Example 2 | 10 | 7 |
| Example 4 | 20 | 7 |
| Example 6 | 10 | 1.5 |
| Example 7 | 6 | 4.5 |
| Comparison | — | 20 |

The comparative experiments show that the addition of the branched vinyl-functional siloxane copolymers of the invention as antimisting additives markedly reduces the formation of aerosol by crosslinkable silicone coating systems in rapid coating processes.

EXAMPLE 10

The alkenyl-functional siloxane copolymers of the invention are used, for reducing the formation of aerosol, as an additive in crosslinkable silicone coating systems for use in rapid coating processes.

The standard formulation used was a mixture of 100 parts by weight of a linear α,ω-divinyldimethylpolysiloxane, having a viscosity of 500 mPa·s (25° C.), 3.0 parts by weight of a linear polysiloxane comprising hydromethylsiloxane and dimethylsiloxane units in a molar ratio of 2:1 having trimethylsiloxane end units and a viscosity of 34 mPa·s (25° C.)

1.0 part by weight of a 1% strength by weight (based on elemental platinum) solution of a platinum-1,3-divinyl-1,1,3,3-tetramethyldisiloxane complex in an α,ω-divinyl-dimethylpolysiloxane having a viscosity of 1000 mPa·s at 25° C., and 0.3 part by weight of 1-ethynylcyclohexanol.

The additives of the invention from the preparation examples indicated in table 2 were added to the standard formulation in the amounts specified in table 2. As a control, a standard formulation without inventive additive was used. These mixtures were used for coating paper.

The substrate used was paper from Tervasaari bearing the designation UPM Brilliant 55, 62 g/m². Coating was carried out on the coating unit from Kroenert, having a 5-roll applicator unit, at 600 m/min. The application roll was run at 95% of the paper speed. The coating was cured in a drying oven with a length of 15 m at 180° C. This corresponds to a crosslinking time of 1.50 seconds.

The formation of aerosol was determined using the Dusttrak Aerosol Monitor Model 8520. Samples were taken between the silicone application roll and the roll nip at a distance of 40 cm from the silicone application roll. The blank aerosol value prior to the coating tests was 0.04 mg/m³. During the coating tests, the minimum and maximum indicated aerosol levels were recorded and the average was calculated. The average aerosol levels measured during the coating tests were corrected by the blank value of 0.04 mg/m³ in order to determine the effect due purely to the antimisting additives of the invention.

The coating weight was determined by means of X-ray fluorescence analysis in reference to an appropriate standard.

Since the extent of aerosol formation is dependent among other things on the coating weight, the average calculated aerosol levels were standardized to a coating weight of 1 g/m² for the purpose of better comparability.

The effect of the antimisting additives of the invention on the curing of the coating system was determined immediately by means of a migration test and in parallel by means of extraction of uncrosslinked fractions in MIBK (methyl isobutyl ketone).

The effect of the antimisting additives of the invention on the adhesion of the coating system to the substrate was determined by means of a ruboff test.

The release values were determined in accordance with FINAT Test Method No. 10. The parameter determined was the low speed release value after 3 days. This was done using commercial self-adhesive tapes 2.5 cm wide, of the designations "Tesafilm K-7476" and "Tesafilm A 7475" (each available commercially from Beiersdorf AG, Hamburg, Germany). FINAT Test Method No. 10 is described in FINAT Technical Handbook 5th edition, 1999, pages 25 to 29.

The test methods are described in the brochure DEHESIVE® Silicones Test Methods from Wacker-Chemie GmbH. The results are summarized in table 2.

TABLE 2

| Additive | Amount [%] | Misting [mg/m³] average | Av. misting [mg/m³] standardized to 1.0 g/m² | Migration | Ruboff | Extract [%] in MIBK | Release value [cN/cm] A7475 | Release value [cN/cm] K7476 |
|---|---|---|---|---|---|---|---|---|
| Ex. 7 | 3.0 | 1.05 | 0.55 | no | no | 3.25 | 14.6 | 22.3 |
| Comparison | — | 73.0 | 38.0 | no | no | 3.05 | 14.8 | 23.2 |

The examples in comparison with the control test without additive show that the addition of the antimisting additives of the invention significantly reduces the formation of aerosol by crosslinkable silicone coating systems in rapid coating processes.

Deleterious effects on migration and substrate adhesion (ruboff) are not observed; within the bounds of measurement accuracy, the proportion of the extractable fractions is not increased. Within the bounds of measurement accuracy, the release values are not affected.

The invention claimed is:

1. A process for reducing the formation of an aerosol during the application of a crosslinkable silicone coating composition, the improvement comprising adding to said crosslinkable silicone coating composition at least one antimisting additive comprising a liquid, branched siloxane polymer containing alkenyl groups prepared by reacting α,ω-dialkenylsiloxane polymers (1) of the formula $$R^1_x R_{3-x}SiO(R_2Si-R^2-SiR_2O)_m(R_2SiO)_n SiR_{3-x}R^1_x \quad (I)$$

where R denotes identical or different, unhalogenated or halogenated hydrocarbon radicals having from 1 to 18 carbon atoms per radical, $R^1$ is a terminally aliphatically unsaturated organic radical, $R^2$ is a divalent organic radical having 2 to 30 carbon atoms per radical or a divalent silane or siloxane radical having 2 to 10 Si units, x is identical or different and is 0 or 1, on average from 0.7 to 1.0, m is 0 or an integer from 1 to 10, and n is 0 or an integer from 1 to 1000, with organosilicon compound(s) (2) containing at least 3 Si-bonded hydrogen atoms per molecule and of the formula

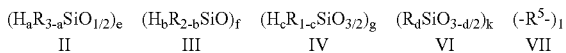

where R is as defined above, $R^3$ is a trivalent to decavalent aliphatically saturated hydrocarbon radical having 1 to 20 carbon atoms, which optionally contains one or more heteroatoms selected from the group of oxygen, boron, silicon and titanium, $R^4$ is a hydrogen atom or an alkyl radical having from 1 to 6 carbon atoms per radical, $R^5$ is a divalent hydrocarbon radical having from 2 to 30 carbon atoms, which can be linear, branched or cyclic and optionally contains one or more non-adjacent oxygen atoms, a is 0, 1, 2 or 3, b is 0, 1 or 2, c is 0 or 1, d is 0, 1 or 2, z is an integer from 3 to 10, e, f, g, k and l are each 0 or a positive integer, with the proviso that when l is a positive integer, the structural elements VII are bonded to the structural elements VI, in the presence of catalysts (3) which promote the addition of Si-bonded hydrogen onto aliphatic double bond.

2. The process of claim 1, wherein the α,ω-dialkenylsiloxane polymer(s) (1) are those of the formula

where R, $R^1$ and n are as defined in claim 1.

3. The process of claim 2, wherein α,ω-dialkenylsiloxane polymer(s) (1) are α,ω-divinylpolydimethylsiloxanes.

4. The process of claim 1, wherein at least one organosilicon compound (2) is that of the formula

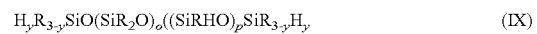

where R is as defined above, y is 0, 1 or 2, o is 0 or an integer from 1 to 1500 and p is an integer from 1 to 200, with the proviso that there are at least 3 Si-bonded hydrogen atoms per molecule.

5. The process of claim 1, wherein said crosslinkable silicone coating composition comprises:

(A) organosilicon compounds having radicals containing aliphatic carbon-carbon multiple bonds, (B) organosilicon compounds containing Si-bonded hydrogen atoms, (C) catalysts which promote the addition of Si-bonded hydrogen onto aliphatic multiple bond, and (D) optionally, one or more inhibitors.

6. A crosslinkable silicone coating composition having reduced aerosol formation, comprising (X) at least one antimisting additive of claim 1, (A) organosilicon compounds having radicals containing aliphatic carbon-carbon multiple bonds, (B) organosilicon compounds containing Si-bonded hydrogen atoms, (C) catalysts which promote the addition of Si-bonded hydrogen onto aliphatic multiple bond, and (D) inhibitors.

7. A shaped body produced by crosslinking a composition of claim 6.

8. The shaped body of claim 7, which is a coating.

9. The shaped body of claim 8, which is a release coating for tacky substances.

10. A process for producing silicone coatings, comprising applying a crosslinkable composition of claim 6 to a surface to be coated, then crosslinking the composition.

11. A process for producing coatings which are release coatings for tacky substances, comprising applying a crosslinkable composition of claim 6 to a surface to be coated, and crosslinking the composition.

* * * * *